US009338056B2

(12) United States Patent
McGee et al.

(10) Patent No.: US 9,338,056 B2
(45) Date of Patent: May 10, 2016

(54) NETWORK ADMINISTRATION SYSTEMS AND METHODS

(75) Inventors: Michael Sean McGee, Round Rock, TX (US); James R. Walker, Austin, TX (US); Mark C. Stratton, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1900 days.

(21) Appl. No.: 11/553,304

(22) Filed: Oct. 26, 2006

(65) Prior Publication Data

US 2008/0104213 A1    May 1, 2008

(51) Int. Cl.
*H04M 15/00* (2006.01)
*H04L 12/24* (2006.01)
*H04L 12/26* (2006.01)
*H04L 12/701* (2013.01)
*H04L 29/08* (2006.01)

(52) U.S. Cl.
CPC .......... *H04L 41/083* (2013.01); *H04L 43/0811* (2013.01); *H04L 45/00* (2013.01); *H04L 67/36* (2013.01); *H04L 41/06* (2013.01); *H04L 41/0816* (2013.01); *H04L 41/22* (2013.01)

(58) Field of Classification Search
USPC ............... 379/112.05, 221.15, 221.08, 26.01, 379/112.1, 114.01, 413.02; 709/223, 224, 709/226, 225
See application file for complete search history.

(56) References Cited

U.S. PATENT DOCUMENTS

| | | | | |
|---|---|---|---|---|
| 6,483,812 | B1 * | 11/2002 | Prorock | 370/252 |
| 6,697,870 | B1 * | 2/2004 | Cafarelli et al. | 709/233 |
| 6,731,625 | B1 * | 5/2004 | Eastep et al. | 370/352 |
| 7,003,562 | B2 * | 2/2006 | Mayer | 709/223 |
| 7,020,697 | B1 * | 3/2006 | Goodman et al. | 709/223 |
| 7,299,294 | B1 * | 11/2007 | Bruck et al. | 709/235 |
| 7,466,651 | B1 * | 12/2008 | Talukdar et al. | 370/230.1 |
| 7,693,042 | B1 * | 4/2010 | Wei | 370/216 |
| 2003/0212684 | A1 * | 11/2003 | Meyer et al. | 707/10 |
| 2005/0270986 | A1 * | 12/2005 | Watanabe et al. | 370/252 |

* cited by examiner

*Primary Examiner* — Yosef K Laekemariam
(74) *Attorney, Agent, or Firm* — Trenner Law Firm, LLC

(57) ABSTRACT

Network administration systems and methods are disclosed. In an exemplary implementation, a method of administering a computer network may include listening to inter-switch communication at a server computer in the computer network. The method may also include parsing the inter-switch communication. The method may also include extracting data about the network from the inter-switch communication for display to a user at the server computer.

20 Claims, 3 Drawing Sheets

NETWORK ADMINISTRATION SYSTEMS AND METHODS

BACKGROUND

Computer networks are increasingly commonplace and enable multiple users to access the same shared resources, such as, e.g., printers, scanners, databases, storage, the Internet, etc. Typically, the physical computer network includes a "maze" of wiring, switches, routers, and other hardware. To complicate matters, much of the wiring may run through conduit, behind walls, through ceilings, or be otherwise laid out such that it may not be readily visible.

Accordingly, the server administration may have little or no understanding of the network topology. If there is a problem with the network, someone has to manually trace the wiring to identify where the problem is. For example, in a teaming environment, all network cards in the "team" may need to be connected to the same switch. If one of the network cards is inadvertently connected to a different switch, the team may not function properly. When the server returns errors, the network administrator (or technician) has to look at the label on the wire and then cross-reference this label to the switch it is connected to using a wiring diagram or database. If the wiring diagram or database is out of date, the network administrator (or technician) has to physically "follow" the wiring to find out which switch it is plugged into. Identifying network problems (such as illustrated by this example, and other network problems) can be a time-consuming, costly, and error-prone process.

DETAILED DESCRIPTION

Network administration systems and methods are disclosed herein. In exemplary embodiments, the systems and methods may be implemented as program code (e.g., a driver) executable by one or more server computers to "listen" to inter-switch communications (i.e., communication between switches) in a computer network environment. Based on these communications, the driver may "learn" the network topology (e.g., switch and switch port connectivity information) and/or other information about the network. This information may be used to warn of configuration errors and/or suggest changes to the network to improve performance. In an exemplary embodiment, the information may be used to automatically make changes to the network.

Figure 1:
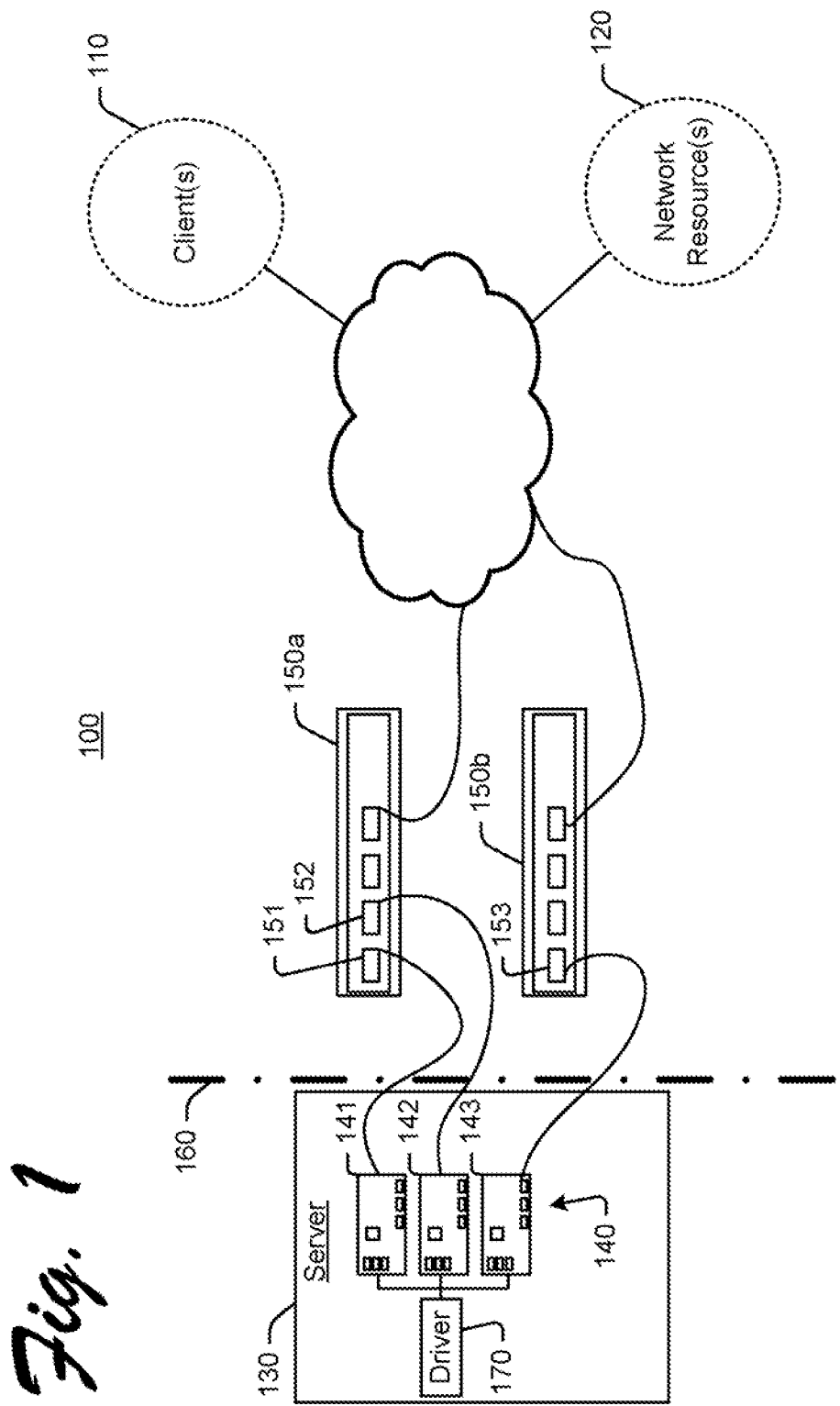
FIG. 1 is a high-level illustration of an exemplary computer network which may implement the network administration systems and methods described herein.

FIG. 1 is a high-level illustration of an exemplary computer network 100 which may implement the network administration systems and methods described herein. The computer network (or network) 100 may be implemented as a local area network (LAN) and/or wide area network (WAN) wherein one or more client computers 110 may be communicatively coupled to one another and/or other network resources 120 (e.g., printers, scanners, databases, storage, the Internet, etc.).

Each of the client computers 110 may include memory, storage, and data processing capability. Client computers are computing devices through which one or more users access the network resources. Client computers may include any of a wide variety of computing systems, such as a stand-alone personal desktop or laptop computer (PC), workstation, personal digital assistant (PDA), or appliance, to name only a few examples.

One or more server computer(s) 130 may also be connected to the network 100. Server computer(s) are computing devices which provides network services, such as, transaction processing, network access, email services, etc. Each server computer 130 may include a plurality of network interface cards (NICs) 140 for connecting to the network 100 via one or more switches 150a-b. For example, NIC 141 is shown connected to port 151 and NIC 142 is shown connected to port 152, both on switch 150a, and NIC 143 is shown connected to port 153 on switch 150b.

The network topology may not be readily visible to the server administrator. For purposes of illustration, the server computer 130 and switches 150a-b that the server computer 130 is connected to are shown in FIG. 1 separated by a barrier (e.g., a wall) 160. This makes it difficult for the network administrator to physically trace the connections (e.g., between the server computer 130 and switches 150a-b) if there is a problem with the network 100. According to the systems and methods for network administration described herein, however, the server administrator can readily identify problems and make changes to the network.

For purposes of illustration, all NICs 141-143 in a teaming environment need to be connected to the same switch (e.g., switch 150a or switch 150b). In FIG. 1, however, two of the NICs 141 and 142 are connected to switch 150a and one of the NICs 143 is connected to switch 150b. Accordingly, the team may not function properly. However, program code (e.g., a driver 170) executable by the server computer 130 "listens" to inter-switch communications (e.g., communication between switches 150a and 150b) and based on these communications, the driver "learns" the network topology (e.g., switch and switch port connectivity information) and/or other information about the network. This information may be used to warn of configuration errors and/or suggest changes to the network to improve performance. In this example, the information may be used to warn the network administrator that two of the NICs 141 and 142 are connected to switch 150a and one of the NICs 143 is connected to switch 150b so that the network administrator can connect all of the NICs 141-143 in the teaming environment to the same switch.

It is noted that the network administration systems and methods are not limited to identifying the problem described in the above example. Information about the network topology and/or other information about the network may be used to warn of any of a wide variety of different configuration errors and/or suggest any of a wide variety of different changes to the network to improve performance.

Before continuing, it is also noted that the network 100 shown and described herein is provided to illustrate an exemplary computer network that may implement network administration systems and methods. It is noted that the network administration systems are not limited to any particular network, and still other computer networks may also implement the network administration systems and methods described herein.

Figure 2:
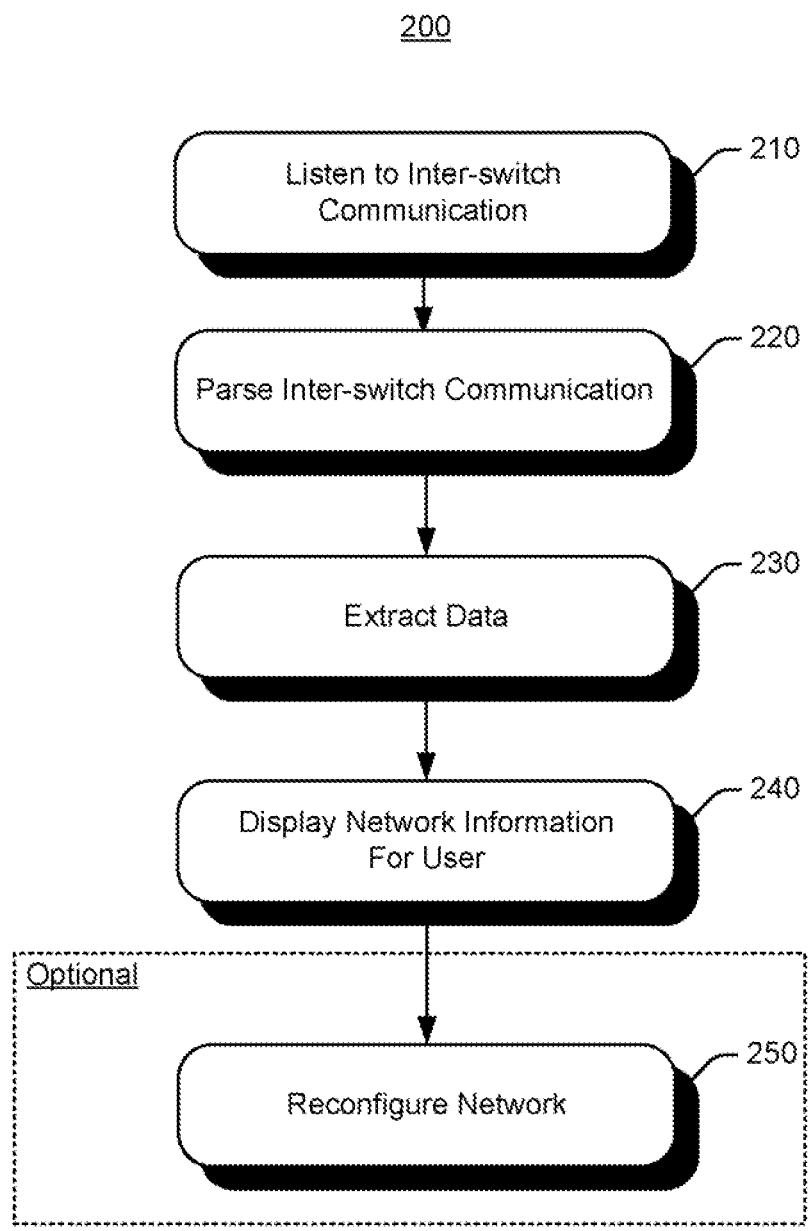
FIG. 2 is a flowchart illustrating exemplary operations which may be implemented by program code for network administration.

FIG. 2 is a flowchart illustrating exemplary which may be implemented by program code (e.g., driver 170 in FIG. 1) for network administration. Operations 200 may be embodied as logic instructions on one or more computer-readable medium (e.g., a driver in computer-readable storage on a server computer and/or elsewhere in the network). When executed on a processor, the logic instruction cause a general purpose computing device (e.g., the server computer) to be programmed as a special-purpose machine that implements the described operations. In an exemplary implementations, the components and connections depicted in the figures may be used for network administration.

In operation 210, a driver may be implemented to passively listen to inter-switch communication. In operation 220, the inter-switch communication is parsed. Data is then extracted in operation 230. Operations 210-230 for "listening" to inter-switch communication and "learning" information about the network may be better understood with reference to the following exemplary implementation.

The following example is provided for the Cisco Discovery Protocol (CDP). The driver first reads the $21^{st}/22^{nd}$ bytes in the frame. A value of 0x2000 indicates that the EtherType is CDP, and processing continues using CDP instructions.

The 7th-12th bytes are read next to obtain the Source Address, and then the 23rd byte is read. A value of 0x01 indicates that the communication is CDP version 1, and processing continues using CDP Version 1 instructions. A value of 0x02 indicates that the communication is CDP version 2, and processing continues using CDP Version 2 instructions.

It is noted that this information applies to untagged CDP frames. Tagged CDP frames have an extra 4 byte header. Accordingly the 25th/26th byte is used to determine if the protocol is CDP, and the 27th byte is used to determine the CDP version.

The following instructions are specific to CDP Version 1. First the 24th byte is read and converted to decimal. This is the number of seconds to keep the information before aging it out. After reading the 24th byte (i.e., the Time to Live Parameter), an aging timer may be started by the driver. Each time a frame is received and reaches this process, the timer is reset to the value of the Time of Live Parameter in the new frame. If the timer reaches 0, the information that is currently displayed is aged out and set to N/A until another CDP Frame is received and processed. If the adapter loses a link, the information may be aged out immediately regardless of the timer.

The 27th/28th bytes are read next. A value of 0x0001 indicates the Device Name/ID section for the device that the NIC is directly connected to. The 29th/30th bytes are read next and converted to a decimal value minus 4. This value is the next number of bytes to read to gather the Device Name/ID of the device. The bytes are read and converted ASCII format for later display (e.g., in the Device Name/ID field in FIGS. 3a-b).

A value of 26 is then added to the decimal value that was converted from the 29th/30th bytes, and the next 2 bytes are read. For example, if the decimal value is equal to 19, then adding 26 to 45, a value that is stored as Value X. Then the 46th/47th bytes are read. A value of 0x0002 is the Address section for the device that the adapter is directly connected to. The next two bytes are read (e.g., in this case the 48th/49th bytes) and converted to a decimal value minus four. This is the next number of bytes to read to gather the Address of the device.

The decimal value that was converted from the 48th/49th bytes is then added to the stored Value X (e.g., 45 in the above example), and the next 2 bytes are read. For example, if the decimal value is 8, then add 45, which is 53. This new Value is X. Then the 54th/55th bytes are read. A value of 0x0003 indicates that this is the Port ID section for the device that the adapter is directly connected to. The next two bytes are then read (e.g., in this case the 56th/57th bytes) and converted to decimal minus four. This is the next number of bytes to read to gather the Port ID of the device. This number of bytes is read and converted to ASCII format for later display (e.g., in the Port ID field in the NCU).

The decimal value that was converted from the 56th/57th bytes is then added to the stored Value X (e.g., in this case 53), and the next 2 bytes are read. For example, if the decimal value is 19, then add 53, which is 72. This new value is stored as Value X. Next the 73rd/74th bytes are read. A value of 0x0004 is the Capabilities section for the device that the adapter is directly connected to. The next two bytes are read (e.g., in the case the 75th/76th bytes) and converted to decimal minus four. This is the next number of bytes to read to gather the Capabilities of the device.

The decimal value that was converted from the 75th/76th bytes is then added to the stored Value X (e.g., in this case 72), and the next 2 bytes are read. For example, if the decimal value is 8, then add 72 for 80. This is stored as the new Value X. The 81st/82nd bytes are read. A value of 0x0005 is the IOS/CAT OS Version string section for the device that the adapter is directly connected to. The next two bytes are read (e.g., in this case the 83rd/84th bytes) are converted to decimal minus four. This is the next number of bytes to read to gather the IOS/CAT OS Version of the device. This number of bytes is read and the information converted to ASCII format for later display (e.g., in the IOS/CAT OS Version field in the NCU).

The decimal value that was converted from the 83rd/84th bytes is then added to the stored Value X (e.g., in this case 80), and the next 2 bytes are read. For example, if the decimal value is 223, then add 80 for 303. This is stored as Value X, and the 304th/305th bytes are read. A value of 0x0006 indicates that this is the Platform Type section for the device that the adapter is directly connected to. The next two bytes are then read (e.g., in this case the 306th/307th bytes) and converted to decimal minus four. This is the next number of bytes to read to gather the Platform Type of the device. This information is converted to ASCII format for later display (e.g., in the Platform Type field in the NCU).

Although not described herein in detail, instruction may also be provided for processing CDP Version 2 communications. In either case, the following decision tree may then be used to display information based on reading the inter-switch communications:

i. If the Device ID values for all Teamed ports DON'T match:
  1. The SLB is NOT supported because NICs are connected to different switches. Warn user if SLB is manually enabled.
  2. Tell the user that they have "switch redundancy" because NICs are attached to different switches.
  3. Advise use of TLB or Dual Channel
ii. If Device ID values for all Teamed ports DO match AND first four and one half bytes of the Source Address values DO match:
  1. Recommend SLB as possible option.
  2. Advise lack of switch redundancy.
iii. If the Device ID values for all Teamed ports DO match but the first four and one half bytes of the Source Address in the CDP frames DON'T match:
  1. Advise user to verify that Teamed ports are attached to same switch if configured for SLB.
  2. If Teamed ports have been verified to be on same switch, inform user they may have switch module redundancy but not switch redundancy.

3. If Teamed ports have been verified to be on same switch, inform user that SLB may be supported and should be used instead of TLB/NFT if not already in use.
4. If the Device ID and first four and one have bytes of Source Address values received on Teamed ports indicate the Team has enough ports on more than one switch to enable Dual Channel.
5. Suggest to the user that Dual Channel is a better team type. This provides "switch redundancy" and "receive load balancing" for same team.

iv. If the CDP version values for all Teamed ports DON'T match:
 1. Then SLB is NOT supported because NICs are connected to different switches. Warn user if SLB is manually enabled.
 2. Tell the user that they most likely have "switch redundancy" since NICs are attached to different switches.

v. If CDP frames are received on some Teamed ports (with matching Device ID values) but CDP frames are not received on all Teamed ports:
 1. Then SLB MAY OR MAY NOT be supported because NICs are in an inconsistent configuration state since not all are receiving CDP frames for some reason.
 2. Warn user of possible configuration problem.

vi. If Device ID, Source Address, and Port ID values for any two Teamed ports DO match:
 1. Warn user that they may be plugged into a hub.

vii. If the VTP Management Domain value for Teamed ports DON'T match:
 1. Warn user that there is a VLAN misconfiguration because the attached switch is managing VLANs differently on the Teamed ports.
 2. Inform user of switch redundancy since this condition requires Teamed ports to be connected to more than one switch.

viii. If the NATIVE VLAN ID received on Teamed ports is different than the configured Native VLAN ID for the Team:
 1. Warn user that the Team VLAN ID and Switch port NATIVE VLAN IDs don't match and will most likely cause a server communication problem.

ix. If the NATIVE VLAN ID received on Teamed ports DON'T match:
 1. Warn user that switch ports have different VLAN configurations that may cause server communications problems.

x. Allow user to enable "Auto Native VLAN ID" option in Teaming GUI by forcing the Team to always use the NATIVE VLAN ID received in the CDP frame.

xi. If the Duplex value indicates that the switches configured duplex is different than the configured Teamed NIC duplex:
 1. Warn user that switch port and Teamed port duplex configurations are different.

Because continuing, it is noted that the CDP protocol is provided merely as an example of one protocol which may the network administrations systems and methods may be implemented with. This example is intended to be illustrative and not limiting.

For purposes of further illustration, the network administration systems and methods may be implemented with Spanning Tree Bridge Protocol Data Unit (BPDU) (either 802.1D or PVST+). With BPDU, the following network information may be gathered:
 Dest MAC=001-80-C2-00-00-00
 Source MAC="Switch MAC address"
 Frame Format=IEEE 802.3 (not Ethernet V2 with TYPE field)
 Length=Variable
 LLC DSAP=0x42 (BPDU)
 LLC SSAP=0x42 (BPDU)
 LLC Unnumbered=0x03
 Protocol Identifier=2 bytes
 Protocol Version=1 byte
 BPDU Type=1 byte
 Flags=1 byte
 Root Identifier=8 bytes
 Root Path Cost=4 bytes
 Transmitting Bridge ID=8 bytes
 Transmitting Port ID=2 bytes The following decision tree may then be used to display information based on reading the inter-switch communications:

i. If the Transmitting Bridge ID values for all Teamed ports DON'T match:
 1. Then SLB is NOT supported because NICs are connected to different switches. Warn user if SLB is manually enabled.
 2. Tell the user that they most likely have "switch redundancy" since NICs are attached to different switches.
 3. Advise use of TLB or Dual Channel (see b. iii)

ii. If Transmitting Bridge ID values for all Teamed ports DO match:
 1. Recommend SLB as possible option (depends on switch support) since ports are on the same switch and SLB is better than TLB.
 2. Advise lack of switch redundancy.

iii. If the Transmitting Bridge ID values received on Teamed ports indicate the Team has enough ports on more than one switch to enable Dual Channel:
 1. Suggest to the user that Dual Channel (depends on switch support) is a better team type. This provides "switch redundancy" and "receive load balancing" for same team.

iv. If Transmitting Bridge ID and Transmitting Port ID values for any two Teamed ports DO match (in other words, same BPDU frame):
 1. Warn user that they may be plugged into a hub (since we received the same switch frame on two ports that should have only been seen on a single port. Hub may be between us and switch).

The network administration systems and methods may be implemented with still other protocols, such as, e.g., Unidirectional Link Detection (UDLD), Dynamic ISL or Dynamic Trunking Protocols (DISL or DTP), Link Aggregation Control Protocol (LACP), Port Aggregation Protocol (PAgP), and Rapid Spanning Tree Protocol (BPDU) (RSTP). The network administration systems and methods may also be implemented with changes to one or more of these protocols, and/or with other protocols now known or later developed, as is readily appreciated by one having ordinary skill in the art after becoming familiar with the teachings herein.

With reference again to FIG. 2, the data obtained by operations 210-230 may be displayed as network information in operation 240, e.g., via an interface such as the GUI 300 described in more detail below with reference to FIG. 3.

Optionally in operation 250, the data obtained by operations 210-230 may be used to reconfigure the network. In an exemplary embodiment, the user may manually reconfigure the network based on the data displayed in operation 240. In another exemplary embodiment, program code may execute to automatically reconfigure the network. For example, communications may be corrupted if the duplex setting of a port does not match on both the server computer and a switch. If it is determined that the duplex settings do not match for a particular connection (e.g., the duplex setting for the server computer is "half" and the duplex setting for the switch is "full"), program code may execute on the server computer to change the duplex setting to "full".

Figure 3:
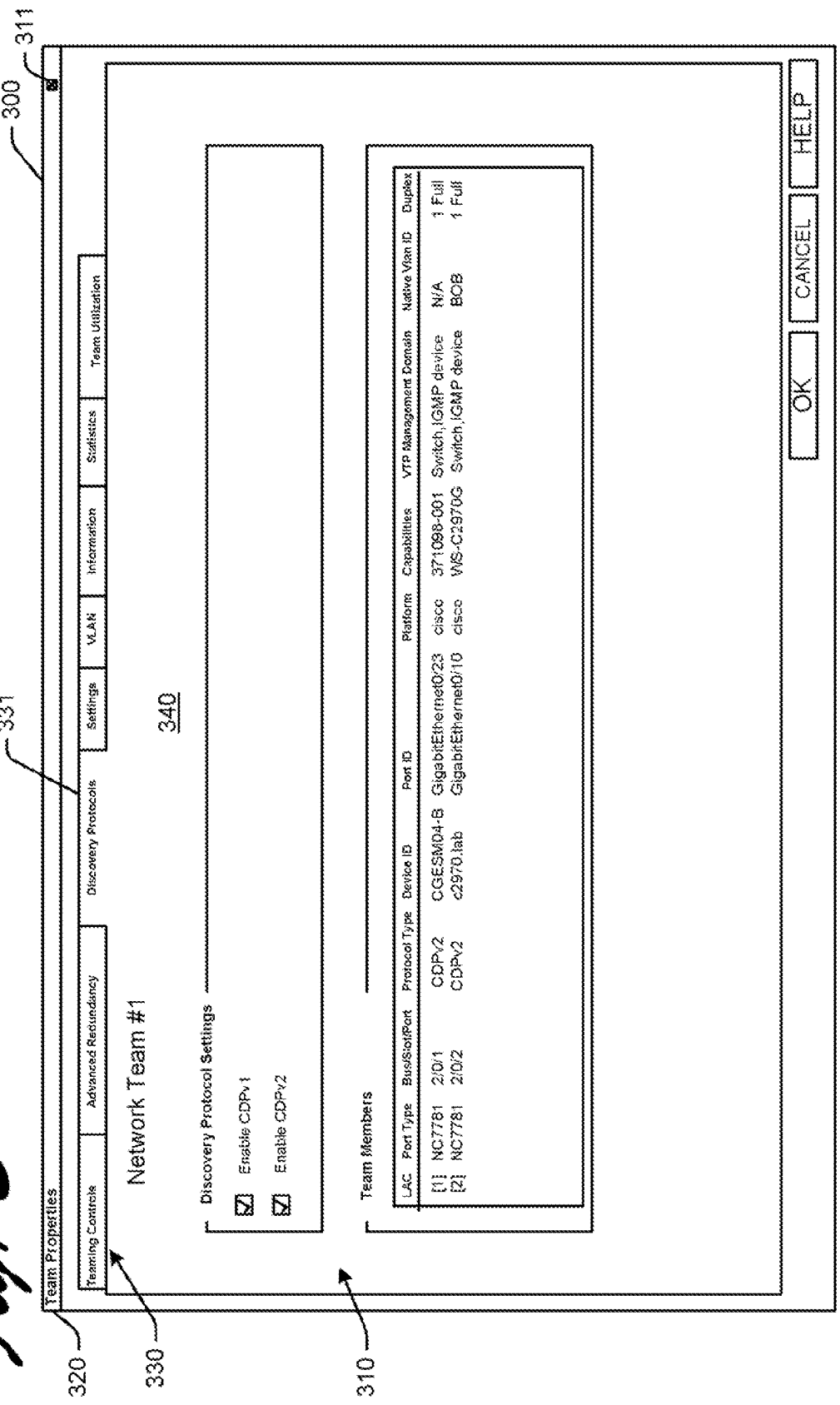
FIG. 3 is an exemplary user interface displaying network information.

FIG. 3 is an exemplary user interface displaying network information. In an exemplary embodiment, the browser interface 300 may be implemented as a graphical user interface (GUI) in a "windows-based" operating system environment (e.g., Microsoft Corporation's WINDOWS®), although the browser interface 300 is not limited to use with any particular operating system. The user may launch the browser interface 300 in a customary manner, for example, by clicking on an icon, selecting the program form a menu, or pressing a key on a keyboard.

The browser interface 300 supports user interaction through common techniques, such as a pointing device (e.g., mouse, style), keystroke operations, or touch screen. By way of illustration, the user may make selections using a mouse to position a graphical pointer and click on a label or button displayed in the browser interface 300. The user may also make selections by entering a letter for a menu label while holding the ALT key (e.g., "ALT+letter" operation) on a keyboard. In addition, the user may use a keyboard to enter command strings (e.g., in a command window).

The browser interface 300 is displayed for the user in a window, referred to as the "application window" 310, as is customary in a window environment. The application window 310 may include customary window functions, such as a Close Window button 312. A title bar 320 may identify the application window 310 for the user (e.g., as the "Team Properties" window). The application window 310 may also include tabbed selections 330 (e.g., labeled "Teaming Controls," "Advanced Redundancy," "Discovery Protocols," "Settings," "VLAN," "Information," "Statistics," and "Team Utilization"). It is noted that the tabbed selections 330 shown in FIG. 3 are exemplary and not intended to be limiting. There may be more of less tabbed selections 330, in addition to tabbed selections not shown in FIG. 3.

In this example, the "Discovery Protocols tabs 331 selection is displayed in the application window 310, and includes an operation space 340. Operation space 340 may include one or more graphics for displaying output and/or facilitating input from the user. In FIGS. 3a-b, the operation space 340 is part of a Network Configuration Utility (NCU), and exemplary information is displayed for a network topology implementing the Cisco Discovery Protocol (CDP).

For CDP, two versions exist from which information can be extracted from the layer 2 discovery frame that provides detailed information about the environment the network interface adapter is connected to. By the drivers registering the multicast address 01-00-0C-CC-CC-CC, the frames are passed up the stack to upper layer protocols in order to extract the detailed information. The information is displayed in the for the server administrator to view and use in understanding their direct-connected topology. The information gathering provides an easy way for the server administrator to retrieve the detailed information because it is all located in a central area in the NCU called Switch Information.

For CDP version 1, the following fields in the CDP frame may be displayed in the NCU:
i. Source MAC Address
ii. Device Name/ID
iii. Port ID
iv. IOS/CAT OS Version Information
v. Platform Type
vi. Capabilities For CDP version 2, the following fields in the CDP frame may be displayed in the NCU:
i. Source MAC Address
ii. Device Name/ID
iii. Port ID
iv. IOS/CAT OS Version Information
v. Platform Type
vi. Capabilities
vii. Native VLAN
viii. VTP Domain Name
ix. Duplex Although not shown, information may also be displayed for other protocols. For example, the following fields from UDLD may be displayed in the Teaming GUI for the Server Administrator:
i. Type 1=Main MAC address of the switch.
ii. Type 2=Module/Port number of the port that transmitted this UDLD frame.
iii. Type 6=Includes the switch serial number (unique for every switch) and the switch name in parenthesis (if applicable/available). Switch Name is "inside" of hex values 0x28 and 0x29 (0x28="(" in ASCII and 0x29="(" in ASCII) and is the same for every port on the same switch.

The following fields from PAgP frames may be displayed in the Teaming GUI for the Server Administrator:
i. PAgP LocalDeviceID (Switch MAC address)
ii. PAgP Device ID field
iii. PAgP Port ID field The following fields from DTP frames may be displayed in the Teaming GUI for the Server Administrator:
i. VTP Domain Name It is noted that the user interface is not limited to any particular embodiment, and user interface 300 described above with reference to FIG. 3 is only intended to be exemplary. In other embodiments, the user interface may include, but is not limited to, subordinate windows, dialog boxes, icons, text boxes, buttons, and check boxes. Still other embodiments are also contemplated.

It is also noted that the exemplary embodiments shown and described are provided for purposes of illustration and are not intended to be limiting. Still other embodiments are also contemplated.

The type of inter-switch communication may be based on at least one of the following protocols: Cisco Discovery Protocol (CDP), Unidirectional Link Detection (UDLD), Dynamic ISL or Dynamic Trunking Protocol (DISL or DTP), VLAN Trunking Protocol (VTP), Link Aggregation Control Protocol (LACP), Port Aggregation Protocol (PAgP), Spanning Tree Bridge Protocol Data Unit (BPDU) (either 802.1D or PVST+), and Rapid Spanning Tree Protocol BPDU (RSTP).

The invention claimed is:

1. A method of administering a computer network, comprising:
listening passively, via a driver of a server computer comprising network interface devices, to inter-switch communication in the computer network not addressed to the server computer;
parsing the inter-switch communication; and
extracting data about the computer network from the parsed inter-switch communication to give switch connection topology of the computer network for display to a user, the switch connection topology comprising coupling of the network interface devices to one or more switches in the computer network.

2. The method of claim 1, comprising identifying a type and a version of the inter-switch communication, wherein the type comprises Cisco Discovery Protocol (CDP).

3. The method of claim 1, wherein:
the driver is associated with the network interface devices;
the switch connection topology comprises the coupling of the network interface devices to ports of the one or more switches;
the one or more switches couple the computer server to the computer network;
the network interface devices comprise network interface cards (NICs), and
the for display comprises for display at the server computer, the display comprising a representation of the switch connection topology.

4. The method of claim 1, wherein:
the one or more switches comprise a first switch and a second switch; and
the extracted data giving the switch connection topology indicates that a first network interface device of the network interface devices is coupled to the first switch, and a second network interface device of the network interface devices is coupled to the second switch;
further comprising, in response to the extracted data, reconfiguring the switch connection topology such that the first network interface device and the second network interface device are coupled to a same switch comprising the first switch or the second switch.

5. The method of claim 1, comprising executing program code at the computer server notifying the user of a lack of switch redundancy and that switch-assisted load balancing (SLB) is an option, in response to the extracted data indicating that the network interface devices are coupled to a same switch of the one or more switches, wherein the one or more switches comprise multiple switches.

6. The method of claim 1, further comprising reconfiguring the switch connection topology based on the extracted data.

7. The method of claim 6, wherein the extracted data is displayed for a user and reconfiguring the switch connection topology is manual based on the extracted data displayed for the user.

8. The method of claim 6, further comprising executing program code at the server computer to automatically reconfigure the switch connection topology, comprising changing a duplex setting on the computer server if the duplex settings do not match for a connection.

9. The method of claim 1, wherein:
the one or more switches comprise a first switch and a second switch;
the network interface devices comprise a first network interface device and a second network interface device in a teaming environment; and
the extracted data giving the switch connection topology indicates that the first network interface device is coupled to the first switch, and the second network interface device is coupled to the second switch; and
in response to the extracted data and if SLB is manually enabled, further comprising executing program code at the computer server warning the user that that SLB is not supported, and advising use of transmit load balancing (TLB) or dual channel.

10. A network administration system comprising:
a server computer in a computer network, the server computer including a plurality of network interface cards (NICs); and
computer readable program code stored on the server computer, the computer readable program code operatively associated with the NICs during execution to:
receive inter-switch communications at the server computer, the inter-switch communications not addressed to the server computer;
extract data from the inter-switch communication; and
determine a network topology from the extracted data, the network topology comprising coupling of the plurality of NICs to one or more switches in the computer network.

11. The system of claim 10, wherein the computer readable program code extracts data by parsing the inter-switch communication, wherein the operations of parsing and extracting are protocol-specific, and wherein the protocol comprises Spanning Tree Bridge Protocol Data Unit (BPDU).

12. The system of claim 10, wherein the server computer to notify a user of a lack of switch redundancy and that switch-assisted load balancing (SLB) with respect to the plurality of NICs is an option, in response to the extracted data indicating that the plurality of network interface devices are coupled to a same switch of the one or more switches, the one or more switches comprising multiple switches.

13. The system of claim 10, wherein:
the one or more switches comprise a first switch and a second switch;
the plurality of network interface devices comprise a first network interface device and a second network interface device in a teaming environment; and
the server computer to warn a user that that SLB is not supported, and advise use of transmit load balancing (TLB) or dual channel, in response to the extracted data indicating the first network interface device is coupled to the first switch, and the second network interface device is coupled to the second switch.

14. The system of claim 10, wherein the computer readable program code executes to reconfigure the computer network based on the extracted data.

15. The system of claim 14, wherein the computer readable program code executes to change at least one duplex setting on the computer server if the duplex settings do not match for a connection in the computer network.

16. The system of claim 10, wherein the computer readable program code executes to display the extracted data for a user.

17. The system of claim 10, wherein the computer readable program code executes to display suggestions for reconfiguring the computer network based on the extracted data.

18. The system of claim 10, wherein the network topology includes switch and switch port connectivity.

19. A non-transitory computer-readable medium comprising program code when executed by a computer server causes the computer server to:
listen passively to inter-switch communication in a computer network, wherein the computer server comprises multiple network interface cards (NICs); and
learn network topology for the computer network by extracting data from the inter-switch communication, wherein to learn comprises to parse the inter-switch communication and to extract data about the network from the inter-switch communication, the network topology comprising coupling of the multiple NICs to one or more switches in the computer network.

20. The system of claim 19, wherein the inter-switch communication is not addressed to the server computer, and wherein the program code when executed by a computer server causes the computer server to notify a user of a lack of switch redundancy in response to the extracted data indicating that the multiple NICs are coupled to a same switch of the one or more switches.

* * * * *